May 23, 1967
M. J. DE GOOD
3,321,057
RETARDER FOR GRAVITY CONVEYOR
Filed April 25, 1966
FIG. 1
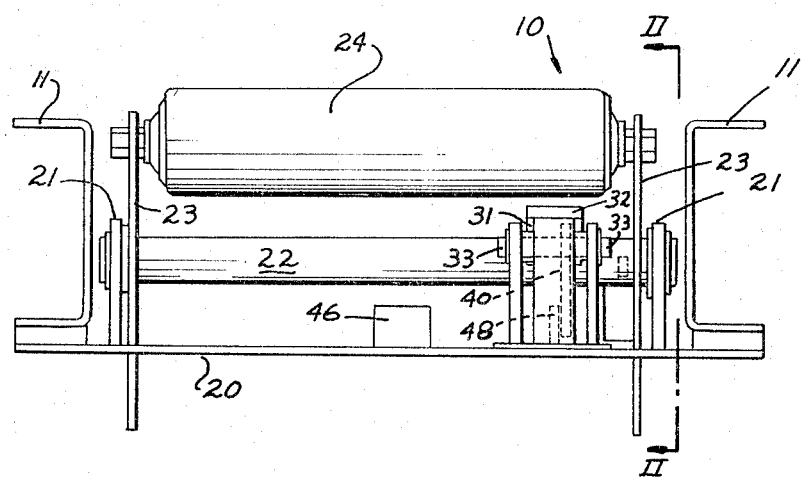
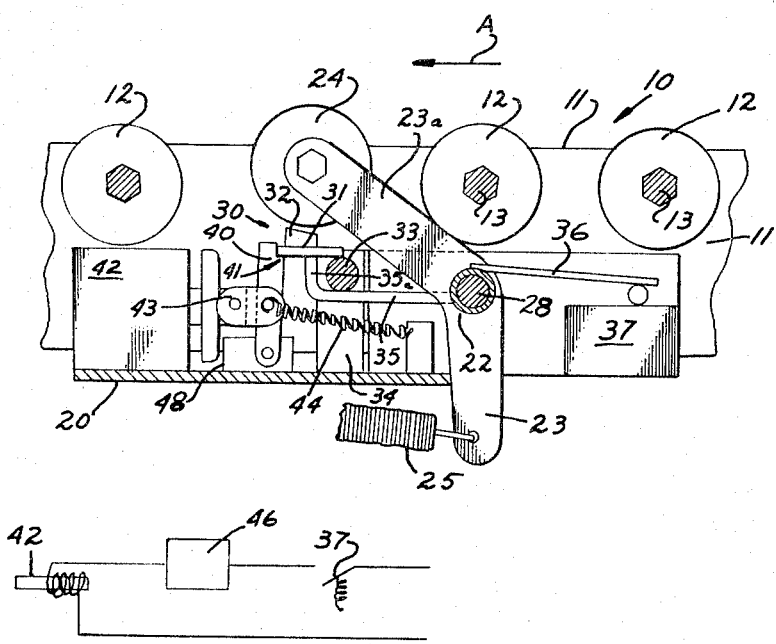
FIG. 3
INVENTOR.
MAYNARD J. DE GOOD
BY
ATTORNEYS

3,321,057
RETARDER FOR GRAVITY CONVEYOR
Maynard J. De Good, Grand Rapids, Mich., assignor to The Rapids-Standard Company, Inc., Grand Rapids, Mich., a corporation of Michigan
Filed Apr. 25, 1966, Ser. No. 545,037
5 Claims. (Cl. 193—35)

This invention relates to conveyors and more particularly to an article retarding mechanism for use with gravity conveyors.

There are a number of situations in the use of gravity conveyors in which it is either desirable or even necessary to retard the flow of articles as they move along the conveyor. A number of devices have in the past been developed especially for this purpose.

One of the primary uses of such retarders is to reduce the velocity of the articles moving along the conveyor. Sometimes the pitch of the conveyor must be such that the articles are accelerated to a velocity beyond that which is satisfactory for proper transportation. At other times the velocity must be reduced before the articles can navigate a corner, pass over a diverter or switch mechanism or before they enter some allied piece of equipment. If their velocity is not reduced they may not track along the conveyor properly, or the following article may impact with a preceding article, the forward movement of which has either been halted or materially reduced. Such impacts are undesirable not only because of damage to the contents but also because of damage to the container. Also, in the case of articles having substantial weight and mass, excessive velocity can result in substantial danger to personnel. Another purpose of these retarders is to singulate or otherwise time the discharge of articles from one portion of the conveyor onto another portion or onto related equipment.

One of the big problems which has plagued existing equipment for this purpose in its inability to handle a wide variety of articles. Equipment capable of handling heavy articles is so insensitive that lighter or smaller articles have a tendency to hang up on the retarders. The opposite is also true, that is, if the retarder is designed to be sufficiently sensitive to operate with small or light articles it is ineffective to retard the heavier articles. Thus these retarders severely restrict the capacity of the conveyor. This characteristic has frequently prevented their use in situations where otherwise they would be highly desirable.

This invention overcomes this problem by providing a retarder having sufficient capacity to handle heavy and massive articles, effectively retarding their forward movement and reducing their velocity, while at the same time having sufficient sensitivity that they can handle small and relatively light articles without danger of the articles being hung up on the retarding mechanism. Furthermore this invention provides a retarder of sufficient sensitivity that it will not prevent the reinitiation of the articles' forward movement, if this has been completely stopped by the retarder's action. This is particularly important when the articles are small or light or the conveyor's pitch is low or the article is of such a nature that it offers relatively high resistance to movement along the conveyor.

This invention also provides retarder equipment which in itself is an accessory permitting it to be used on conveyors of existing design without modification of the conveyor, or it may be readily installed on existing equipment already in operation in the field.

These and other objectives and advantages of this invention will be immediately understood by those acquainted with the engineering and use of conveying equipment upon reading the following specification and the accompanying drawings.

In the drawings:

FIG. 1 is a sectional elevation view of a conveyor equipped with this invention;

FIG. 2 is a sectional elevation view taken along the plane II–II of FIG. 1; and

FIG. 3 is a schematic diagram of the electrical circuitry of this invention.

In executing this invention an assembly is provided which can be mounted to a standard roller bed gravity conveyor. This assembly includes a retarding roller movably mounted to shift between a raised and a depressed position. In its raised position, it is slightly above the surface of the conveyor bed to positively engage articles moving along the bed and under the weight of the articles is depressed until it is flush with the conveying surface.

Beneath this roller is a brake pad which also is movable between a raised and a lowered position. In its raised position, the brake pad engages the depressed roller restricting or eliminating the roller's freedom of rotation. As the retarding or raised roller is depressed, it triggers a switch generating a signal. The signal passes through a timer which delays its transmission to an actuator. The actuator, when activated, drops the brake pad, disengaging it from the retarding roller, thus freeing the roller for rotation. With the brake pad disengaged, the article is once more free to reinitiate its forward motion.

After the article has passed beyond the retarding roller, the retarding roller automatically resets itself in its raised position and, at the same time, the brake pad is re-elevated into the position where it will engage the retarding roller when it is again depressed. This entire mechanism is mounted on a plate which can be bolted to the conveyor frame with the retarding roller replacing one of the standard rollers in the conveyor bed.

With specific reference to the drawings, the numeral 10 indicates a conventional gravity conveyor having a pair of side rails 11 between which are standard conveyor rollers 12, collectively forming a conveying surface over which articles are moved along the conveyor. The rollers 12 are mounted for free rotation about axles 13. All of this construction is conventional in the conveyor art and has been utilized for a number of years; therefore, more detailed description of this equipment is not considered necessary.

A plate 20 is mounted beneath the conveyor frame and may be secured to the side rail members 11 in any suitable manner such as by bolting. Secured to the plate are a pair of standards 21 so spaced that they are between the side rail members 11. The standards are connected by a rod 28. The rod 28 rotatably mounts the pivot sleeve 22 to which is affixed the rocker arms 23. The rocker arms are positioned close to the standards 21. The rocker arms 23, together with the pivot sleeve 22, form a unitary link assembly. Each of the rocker arms 23 has an upwardly inclined portion 23a and a depending portion 23b (FIG. 2). The depending portions 23b extend through a suitable, slotted opening in the plate 20, permitting them freedom of movement when the rocker arms pivot on the pivot rod 28. A retarder roller 24 is mounted for free rotation between the upper ends of the inclined portions 23a of the rocker arms 23. The retarder roller 24 replaces one of the conveyor rollers 12.

A retarder spring 25 is secured to the lower ends of each of the depending portions 23b of the rocker arms. The other end of each retarder spring 25 is secured to the plate 20 with the springs biasing the rocker arms into the position illustrated in FIG. 2, raising the retarder roller 24 slightly above the plane defined by the surfaces of the other conveyor rollers 12.

Directly beneath the retarder roller 24 is a brake assembly consisting of a brake member 30 having a brake plate 31, and a brake pad 32. The brake pad 32 may be of any suitable material having a surface characterized by a high co-efficient of friction. The brake plate is pivotly mounted by pivot pin 33 to the brake mounts 34. The brake mounts 34 are secured to the plate 20. A reset arm 35 has one end secured to the pivot sleeve 22 for pivotal rotation with the rod. The other end of the reset arm 35 is bent upwardly to form a finger 35a engaging beneath the brake plate 31. Thus, as the retarder roller 24 shifts to its normal or raised position, the reset arm 35 raises or pivots the brake plate 31 up to its raised or operative position. In this position the top surface of the brake pad engages the bottom of the retarder roller 24 before that roller is depressed flush with the conveyor surface formed by the rollers 12.

Also secured to the pivot rod 22 is a trigger finger 36 projecting oppositely from the reset arm 35. The free end of the trigger finger engages the sensor switch 37 which is of the normally closed type, opening only when it is actuated such as by contact with the trigger finger 36.

Beneath the free end of the brake plate 31 is an upstanding latch 40. The lower end of the latch is pivotally mounted to the plate 20 by the block 48. The upper end of the latch 40 has a notch to receive the free end of the brake plate 31. The latch 40, intermediate its upper and lower ends, is secured to an actuator or solenoid 42 by a linkage 43. The latch 40, linkage 43 and the armature of the solenoid 42 are urged toward the brake plate 31 by a spring 44. Thus, when the solenoid is inoperative the latch 40 is pivoted to its normal position beneath the brake plate 31. The length of the latch 40 when in erected position supports the brake plate 31 in its raised or operative position.

The circuitry of this invention is illustrated in FIG. 3. In this figure it will be seen that one of the conductors to the solenoid 42 is interrupted by the sensor switch 37 and also passes through a timer 46. The timer 46 effects a delay whereby a signal generated by the closing of the sensor switch 37 is delayed for a predetermined interval before it is transmitted to the solenoid 42.

*Operation*

The operation of this invention will now be described. Assuming the mechanism to be in the position illustrated in FIG. 2, an article approaching the retarder along the conveyor in the direction of the arrow A will, upon contacting the retarder roller 24, depress the roller under the weight of the article. The retarder spring 25 is so designed that only slight downward force on the retarder roller 24 will be sufficient to overcome the bias of the spring and shift the roller to its lowered position.

As the retarder roller 24 shifts downwardly, it makes contact with the brake pad 32. By reason of the brake pad's high co-efficient of friction, the freedom of the roller 24 to rotate is either restricted or entirely eliminated. Thus, the roller applies a frictional retarding force to the article slowing or halting its forward movement. The weight of the article exterted through the retarder roller 24 against the brake pad 32 will not cause the brake plate 31 to pivot downwardly since it is positively supported by its engagement with the latch 40.

As the retarder roller 24 shifts downwardly against the brake pad 32, the trigger finger 36 is pivoted upwardly, disengaging it from the sensor switch 37. This generates a signal which is delayed by the timer 46. After a predetermined interval which can be preset from a portion of a second to several seconds, in duration, this signal is relayed to the solenoid 42. This actuates the solenoid causing it to shift to the left as the structure is illustrated in FIG. 2.

The actuation of the solenoid shifts the latch 40 to the left, withdrawing it from beneath the brake plate 31. The brake plate is then free to pivot downwardly until it comes into contact with the lowered finger 35a of the reset arm 35. This downward shifting of the brake plate is sufficient to disengage the brake pad 32 from the retarder roller 24. This action frees the retarder roller and the article once more under its own weight can resume forward movement along the conveyor.

As soon as the article releases the retarder roller 24, the retarder spring 25 will assert its bias, pivoting the retarder roller upwardly into its raised position. This will pivot the trigger finger 36 downwardly opening the sensor switch 37. The opening of the sensor switch deactivates the solenoid 42, permitting the latch spring 44 to reassert itself. This pivots the latch once more to the right. In the meantime, the upward pivoting of the retarder roller 24 swings the reset arm 35 upwardly, forcing the brake plate 31 to follow the retarder roller 24 in its upward movement but without making contact with it. Thus, the brake plate will have been positioned to be received in the notch 41 of the latch 40 as the latch swings to its erected position. Should there be a lack of synchronization in the operation of these components no harm will result, inasmuch as the spring 44 will simply pivot the latch 40 until it bears against the end of the brake plate 31, where it will remain until the brake plate 31 rises to a position where it can be received in the notch 41. Thereafter, the spring 44 will pivot the latch the rest of its travel toward erected position.

It will be seen that by changing the values of the timer 46, the retarder can be adjusted to merely slow the forward motion of the articles, or to bring their motion to a halt, or to halt the motion for a substantial period of time, depending upon the result desired. It will also be observed that a retarder of this construction can handle a wide variety of articles since the article need have only minimal weight to pivot the retarder roller into braking position. Thus, the size and weight of the articles can vary through a wide range, without affecting the effectiveness of the retarder. The heavier the article, the greater the force with which the retarder roller 24 will press against the brake pad 32 and thus the greater the braking action of the retarder roller. In this connection, it is important that the retarder roller make braking contact with the brake pad 32, before the retarder roller 24 has completed its shift to a position where it is flush with the conveying surface formed by the rollers 12. This will not impede the forward motion of the articles when the retarder roller is released, since the release of the latch 40 and the lowering of the reset arm 35, leaves the retarder roller 24 free to drop further until it is flush with the plane of the tops of the rollers 12.

This invention provides a self-contained operative package which may be mounted on any standard roller conveyor simply by removing a selected roller and substituting this mechanism. The mechanism is readily mounted as a self-contained unit by bolting it to the conveyor frame. Thus, it is suitable both for new equipment and for conversion of existing equipment.

While a preferred embodiment of this invention has been illustrated and described, it will be understood that various modifications thereof may be made incorporating the basic principles of this invention. Such modifications as do embrace the basic principles of the invention are to be considered within the hereinafter appended claims unless these claims by their language expressly state otherwise.

I claim:

1. In combination with a gravity conveyor having a plurality of freely rotatable article transporting elements arranged to form a conveying surface along which the articles travel, an article brake comprising: one of said elements being movably supported to shift from a raised position above said conveying surface to a lowered position generally flush therewith and means resiliently urging said one element into said raised position; a brake member movably mounted to shift between extended and retracted positions, said brake member having a surface characterized by a high co-efficient of friction engaging said one element when said brake member is extended and said one element is in said lowered position; an actuator; said brake member upon activation of said actuator shifting to retracted position to disengage said one element; a signal generating sensor tripped by said one element when said one element shifts to its lowered position, said sensor being operatively connected to said actuator by a signal conducting member; said signal conducting member having a timer for delaying the transmission of the sensor's signal to the actuator for a predetermined interval.

2. In combination with a gravity conveyor having a plurality of freely rotatable article transporting elements arranged to form a conveying surface along which the articles travel, an article brake comprising: a link supporting one of said elements in raised position with its top surface above said conveying surface, said link being movable to shift said raised element to a position generally flush with said conveying surface and means urging said link into said raised position; a brake member having a surface characterized by a high-coefficient of friction movably mounted to shift between an extended position and a retracted position, said surface when said brake member is in extended position being in contact with said raised element when it is generally flush with said conveying surface; said raised element being operatively connected to said brake member to shift said brake member to its extended position when said raised element shifts to its raised position; a latch holding said brake member in extended position and means to disengage said latch from said brake member; a sensor tripped by said raised element upon the latter shifting to a position generally flush with said conveyor surface for actuating said means disengaging said latch from said brake member and a timer for delaying the actuation of said means after tripping of said sensor for a predetermined interval.

3. The combination recited in claim 2 wherein said brake member is a lever pivotally mounted at its lower end to shift its upper end from an erected position to a retracted position; in erected position said brake member being vertically positioned beneath said brake member and supporting said brake member against downward movement when engaged by said element mounted on said link.

4. The combination recited in claim 2 wherein said link has reset means thereon engaging said brake member and urging said brake member upwardly as said link shifts the element thereon to its raised position.

5. The combination recited in claim 4 wherein said reset means is an arm engaging beneath said brake member.

References Cited by the Examiner
UNITED STATES PATENTS

| | | | |
|---|---|---|---|
| 1,560,830 | 11/1925 | Langsdorf | 193—35 |
| 1,900,150 | 3/1933 | Anderson | 198—35 |

EVON C. BLUNK, *Primary Examiner.*

M. L. AJEMAN, *Assistant Examiner.*